United States Patent
Meter

(10) Patent No.: US 6,708,755 B1
(45) Date of Patent: Mar. 23, 2004

(54) METHOD FOR CONTROLLING THE TEMPERATURE IN A CLIMATE CHAMBER AND CLIMATIC DEVICE

(75) Inventor: Tjitze Meter, Veenendaal (NL)

(73) Assignee: T. Meter Holding B.V., Veenendaal (NL)

(*) Notice: Subject to any disclaimer, the term of this patent is extended or adjusted under 35 U.S.C. 154(b) by 0 days.

(21) Appl. No.: 09/762,708
(22) PCT Filed: Aug. 13, 1999
(86) PCT No.: PCT/NL99/00514
§ 371 (c)(1),
(2), (4) Date: Feb. 12, 2001
(87) PCT Pub. No.: WO00/08922
PCT Pub. Date: Feb. 24, 2000

(30) Foreign Application Priority Data

Aug. 13, 1998 (NL) .............................................. 1009860

(51) Int. Cl.[7] .......................... F24D 5/10; F28F 13/06; F25D 17/04; A01K 41/02
(52) U.S. Cl. ........................ 165/53; 165/55; 165/108; 62/406; 119/300; 119/316
(58) Field of Search ......................... 165/53, 55, 108, 165/121, 57; 62/239, 406; 99/476, 474; 119/303, 304, 306, 312, 313, 314, 315, 316, 317, 300

(56) References Cited

U.S. PATENT DOCUMENTS

| 1,722,214 | A | * | 7/1929 | Hillpot ........................ 119/325 |
| 1,952,599 | A | * | 3/1934 | MacKay ...................... 119/313 |
| 2,791,199 | A | | 5/1957 | Hamnett | |
| 2,997,021 | A | * | 8/1961 | Bailey ......................... 119/311 |
| 3,820,507 | A | * | 6/1974 | Dugan et al. ............... 119/311 |
| 4,339,928 | A | * | 7/1982 | Guibert ......................... 62/62 |
| 4,579,051 | A | | 4/1986 | Berrens | |
| 5,410,985 | A | * | 5/1995 | Schritz ....................... 119/315 |
| 5,519,188 | A | | 5/1996 | Yuichi et al. | |
| 5,718,628 | A | * | 2/1998 | Nakazato et al. ........... 454/184 |
| 5,949,646 | A | * | 9/1999 | Lee et al. ............... 165/104.33 |

FOREIGN PATENT DOCUMENTS

| DE | 4002560 | 8/1991 |
| FR | 2728761 | 7/1996 |
| WO | WO 9612144 | 4/1996 |

* cited by examiner

Primary Examiner—Henry Bennett
Assistant Examiner—Tho V Duong
(74) Attorney, Agent, or Firm—Anthony H. Handal; Kirkpatrick & Lockhart LLP

(57) ABSTRACT

The invention relates to a method for controlling the temperature in a climate chamber (21), in which a flow of air is guided through the climate chamber (21), the temperature of which air flow is controlled with the aid of a heat exchanger, and the air flow is brought to the desired temperature with the aid of a first heat exchanger prior to or during the introduction of the air flow into the climate chamber, and in which method the air flow in the climate chamber (21) is forced past a second heat exchanger, during which process any heating or cooling of the air flow is negated. The invention also relates to a device for carrying out the above method.

16 Claims, 4 Drawing Sheets

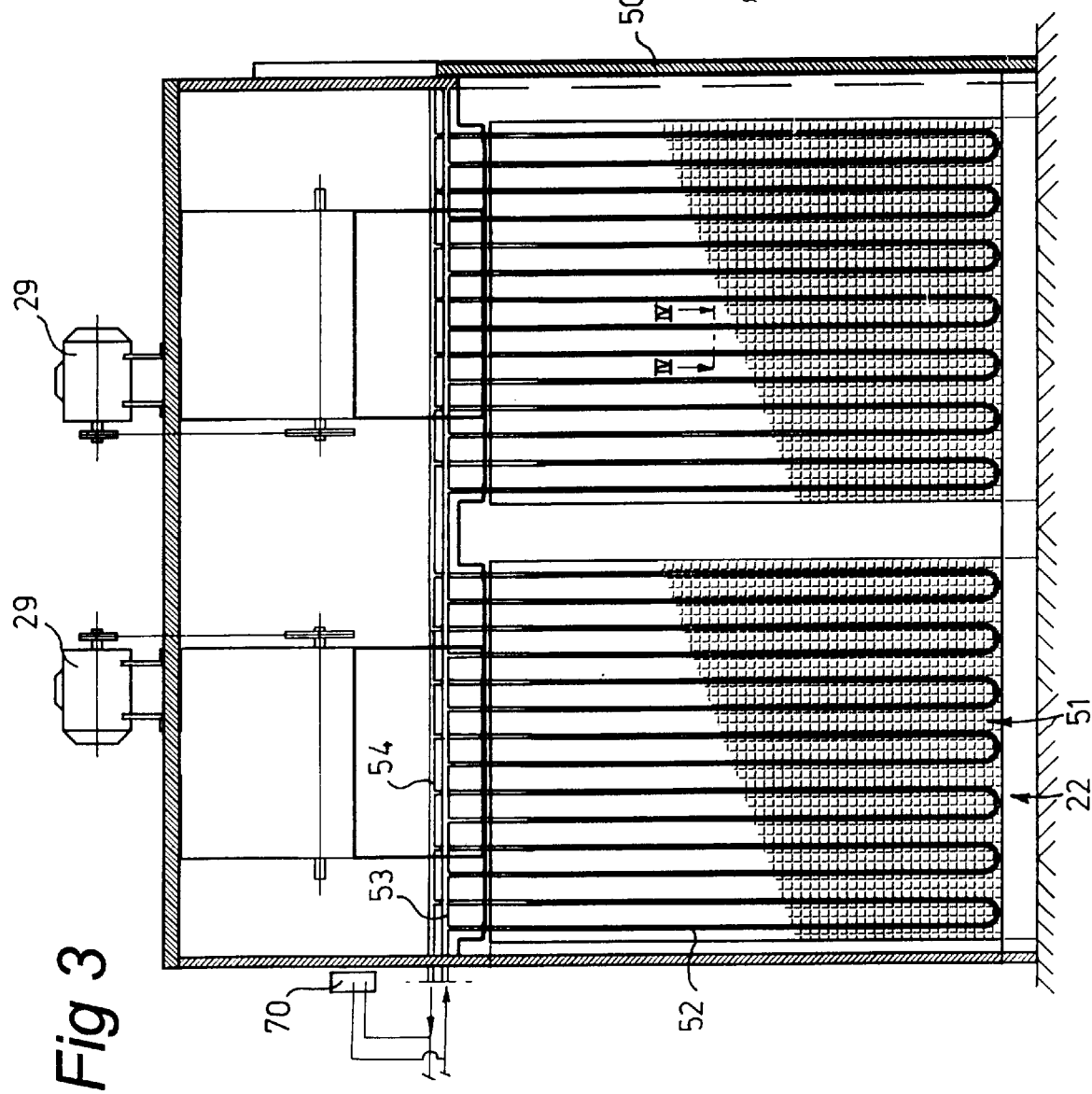

METHOD FOR CONTROLLING THE TEMPERATURE IN A CLIMATE CHAMBER AND CLIMATIC DEVICE

BACKGROUND OF THE INVENTION

The present invention relates in the first instance to a method for controlling the temperature in a climate chamber, in which a flow of air is guided through the climate chamber, the temperature of the air flow is controlled with the aid of a heat exchanger, and the air flow is brought to the desired temperature with the aid of a first heat exchanger prior to or during the introduction of the air flow into the climate chamber.

A method of this nature is known in the prior art. The known method is used, inter alia, for controlling the temperature in hatching machines, for hatching eggs, such as hens' eggs.

In a known climatic device which is used for hatching eggs, means for influencing the temperature in the climate chamber are arranged centrally in the climate chamber. In addition to these heating and/or cooling means, there are generally fans for dispersing the heated or cooled air throughout the entire climate chamber. In the case of eggs, for example, it is difficult to use these fans to achieve an air flow which imposes a desired temperature on all the eggs. Firstly, it is difficult, with the fans according to the prior art, to effect an even flow of air through the climate chamber. Moreover, it is difficult to prevent the formation of temperature gradients. Since the heating and/or cooling means are located in a central position, the eggs located next to these means will generally be heated or cooled more quickly and more efficiently.

The operation and design of a known climatic device which is used for hatching eggs is described in more detail below with reference to FIG. 1

SUMMARY OF THE INVENTION

The object of the present invention is to provide a method of the type mentioned in the introduction in which a good, even flow of air through the climate chamber is achieved, in which products located in the climate chamber can be heated or cooled with the aid of the air flow, and in which the formation of temperature gradients in the climatic device is prevented as far as possible.

In the present invention, this object is achieved by the fact that the air flow in the climate chamber is forced past a second heat exchanger, during which process any heating or cooling of the air flow is negated.

The advantage of this method is that the air which is used for supplying heat to products which are situated in the climate chamber or which is used to dissipate heat which is introduced into the climate chamber by the products, after heat exchange with the products, can be returned to the desired air temperature with the aid of the second heat exchanger.

The present invention moreover relates to a climatic device comprising:

a climate chamber, having a bottom wall, a top wall, a front and a rear side wall and a first and a second end wall, means for heating or cooling the air in the climate chamber, the said means being accommodated in the said chamber, and ventilation means for generating an air flow through the climate chamber, in which device the end walls are air-permeable, the ventilation means being used to generate an air flow from the first end wall, through the climate chamber, towards the second end wall, and the device comprising preheating or precooling means for bringing the air flow to the correct temperature prior to or during the passage of the air flow through the first end wall.

The climatic device according to the invention is characterized in that at least one air-permeable partition is incorporated between the end walls, in which partition the heating or cooling means are accommodated.

In this case, it is advantageous for the preheating or precooling means to be accommodated in the first end wall and for the device to be provided with control means for setting the temperature of the heating or cooling means and of the preheating or precooling means.

These measures allow an air flow to flow into the climate chamber from one side of the climate chamber and to flow out of the climate chamber on the other side. After it has passed a limited number of products, the air flow will pass through a partition. Since this partition contains means for influencing the temperature of the air flow, the temperature of the air can thus be adjusted. If the air has been heated or cooled as a result of moving past products located in the climatic device, this cooling or heating can be negated. The products which are located downstream of a partition are then brought into contact with flowing air which is again brought to the optimum temperature.

In brief: by means of these measures, the temperature of the flowing air is locally regulated.

The device according to the present invention is further improved by the fact that the ventilation means are in communication, by means of a flow passage, with the first end wall, the extent of air permeability of the first end wall being lower than that of the first (in the direction of flow) partition. In this case, it is advantageous for the air permeability of the second end wall to be lower than that of the last (in the direction of flow) partition.

This measure ensures that the air cannot flow freely into the climatic device through the first end wall, but rather a pressure is built up in front of the first end wall of the climatic device, in which case the air will flow uniformly into the climatic device both on the top side and on the bottom side of the wall. In this way, differences in flow rate over the surface of the wall are avoided as far as possible. These measures improve the uniformity of the flow of air through the climate chamber.

According to the present invention, it is possible for the air permeability of the first end wall preferably to be 5 to 25%, more preferably 5 to 15%, and most preferably 10%, while the air permeability of the first (in the direction of flow) partition is preferably 20 to 50%, more preferably 25 to 40%, and most preferably 30%.

In this case, it is advantageous for the air permeability of the second end wall preferably to be 5 to 25%, more preferably 5 to 15%, and most preferably 10%, while the air permeability of the last (in the direction of flow) partition is preferably 20 to 50%, more preferably 25 to 40%, and most preferably 30%.

These measures further optimize the flow of air through the climate chamber.

According to the present invention, it is possible for the distance, measured in the direction of flow, between the successive end walls and partitions to be matched to the width of two standard incubation trolleys.

In this case, it is advantageous for the height of the end walls, the side walls and the partitions to be matched to the height of a standard incubation trolley.

In the prior art, it is conventional to design hatching installations with a total of 12 incubation trolleys. The measures described above make it possible to employ standard incubation trolleys in a standard production process in a farm. Further adaptations to comply with components of the incubation process can then be dispensed with.

Furthermore, it is possible, according to the present invention, for at least one side wall to be designed as a sliding wall.

These measures ensure that when the sliding wall is opened there is sufficient free movement space available for rolling the incubation trolleys into and out of the climate chamber.

BRIEF DESCRIPTION OF THE DRAWINGS

The present invention will be explained in more detail below with reference to a number of drawings, in which:

FIG. 3 shows a diagram of a partition from the climatic device shown in FIG. 2.

FIG. 4 shows a cross section through part of the partition shown in FIG. 3, on line IV—IV.

DETAILED DESCRIPTION OF THE PREFERRED EMBODIMENTS

Figure 1:
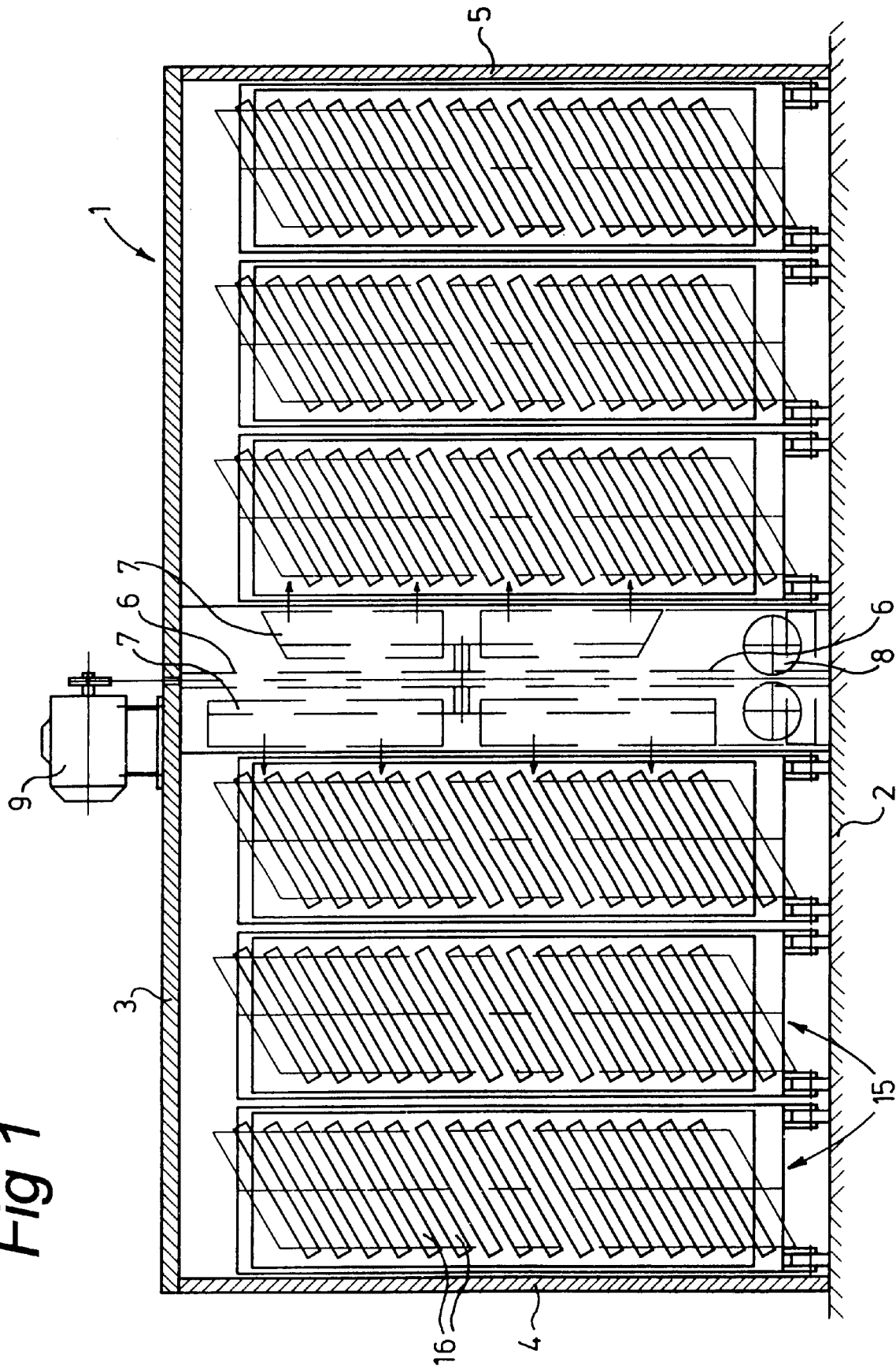
FIG. 1 shows a front view, in cross section, of a climate chamber according to the prior art, with incubation trolleys located therein.

FIG. 1 shows a climate chamber 1 which forms part of a climatic device according to the prior art. The climate chamber 1 comprises a base 2, a top wall 3, a first end wall 4 and a second end wall 5. Moreover, the climate chamber 1 is furthermore closed off by means of side walls (not shown). In order to be able to control the temperature in the climate chamber 1, heating and/or cooling means 6, which are diagrammatically depicted in the drawing, are arranged centrally in the climate chamber 1. In order to be able to distribute the heat or cold generated by these heating and/or cooling means 6 throughout the entire climate chamber 1, fans 7 are arranged next to the heating and/or cooling means 6 on both sides. These fans 7 are used to generate a flow of air through the climate chamber 1. In order to be able to influence the humidity in the climate chamber 1 as well as the temperature, cylinders, with the aid of which water can be sprayed into the climate chamber 1, are located in the climate chamber 1.

It can furthermore be seen in FIG. 1 that incubation trolleys 15 are located in the climate chamber 1. These incubation trolleys 15 are provided with trays 16, on which eggs, such as hens' eggs, can be placed. When hatching hens' eggs, the eggs are located in the climate chamber for roughly 18 days. At the start of the hatching process, heat has to be supplied to the eggs with the aid of the heating and/or cooling means. After a certain amount of time, when the embryo is growing in the eggs, the eggs will begin to emit heat. 4800 eggs can be placed in a standard incubation trolley 15. Twelve incubation trolleys are placed in a standard incubation chamber, or climate chamber 1. This means that there are 57,600 hens' eggs in the climate chamber 1. Together, in the course of the hatching process these eggs produce an enormous amount of energy.

The only way of being able to supply or dissipate the energy to or from the eggs during the course of the incubation process is by using both the heating and/or cooling means 6 and the fans 7. Using a climate chamber 1 according to the prior art as shown in FIG. 1, it has proven impossible to accurately control the temperature in the climate chamber 1 at all locations. The average ideal hatching temperature during the hatching process is approximately 99.7° F. In a climatic device according to the prior art, temperature variations of 3° F. or more may occur. The reason for this is that the fans are not able to guide the air successfully over all the eggs. Of late, eggs have become increasingly large, with the result that it becomes more difficult for the flow of air to move over the eggs. As a result, the temperature differences will increase further. Consequently, not all the eggs will be hatched under the most ideal conditions. Firstly, this means that not all the eggs will be hatched. Secondly, this means that the quality of the chicks from the egg is not optimum.

The object of the present invention is to provide a climate chamber in which the temperature, humidity and air flow can be controlled much more accurately.

Figure 2:
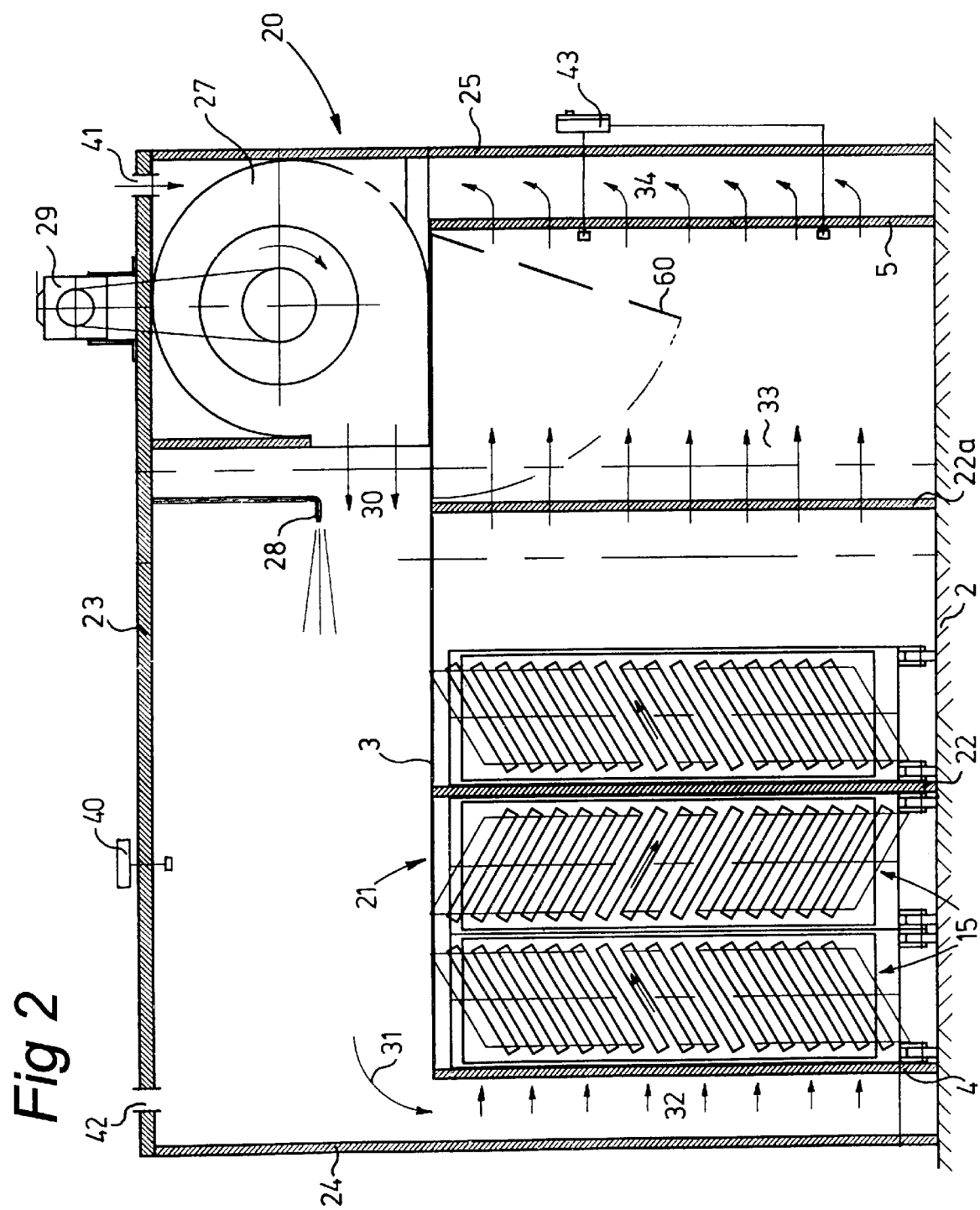
FIG. 2 shows a front view, in cross section, of a climatic device according to the present invention, with incubation trolleys located therein.

FIG. 2 shows a climatic device 20 according to the present invention. The climatic device 20 comprises a climate chamber 21 in which incubation trolleys 15 are located. The climate chamber 21 comprises a base 2, a top wall 3, a first side wall 4 and a second side wall 5. Moreover, the climate chamber is provided at the front and the rear with side walls (not shown). Partitions 22 are located between the first end wall 4 and the second end wall 5. The climate chamber 21 is furthermore enclosed by outer walls 23, 24 and 25, with the aid of which the climatic device 21 is separated from the environment. Furthermore, ventilation means 27, for example in the form of a centrifugal fan, are accommodated in the climatic device 20. This centrifugal fan is driven with the aid of a motor 29. Beneath the fan 27, there is a flap 60. When this flap 60 is opened, the fan 60 can easily be reached, for example for maintenance work.

Two partitions 22, 22a are arranged in the climate chamber 21, substantially parallel to the end walls 4 and 5. Heating and/or cooling means are accommodated in these partitions 22, 22a. The heating and/or cooling means may be designed as pipes 52 which are arranged against the wall 22, 22a (cf. FIG. 3).

Furthermore, preheating or precooling means are preferably arranged in the first end wall 4. These preheating or cooling means may also be designed as pipes.

Furthermore, the climatic device 20 accommodates a nozzle 28 for injecting moisture into the air, in order to influence the atmospheric humidity. The temperature and humidity of the air which flows through the second end wall 5 is measured with the aid of measuring means 43. These measuring means will be connected to the control means 70 (cf. FIG. 3) which are connected to the heating and/or cooling means.

The climatic device according to the present invention operates as follows. With the aid of the ventilation means 27, a flow of air in the direction of arrows 30 is generated. The air moves onwards through the upper chamber of the climatic device 20, in the direction of arrows 31 and 32. Depending on the atmospheric humidity measured, moisture is introduced into the air with the aid of the nozzle 28. When the flow of air passes through the first end wall, the air moves past the preheating or precooling means. With the aid of these means, the air flow is brought to the desired temperature. From the first end wall 4, the air moves onwards towards the second end wall 5. If products are located in the climate chamber 21, the air flow is guided over these products. FIG. 2 shows the situation in which the climate chamber 21 is filled with incubation trolleys 15. When the air flow has moved past two hatching trolleys 15 (in the direction of movement), the air flow then moves through the first partition 22. Heating and/or cooling means are surrounded by the flow of air. With the aid of these means, the temperature of the air can be controlled at the location of the first partition 22. In this way, any heating or cooling of the air caused by heat exchange between the flow of air and the products can be negated.

Then, the air flows onwards through another two incubation trolleys 15 located one behind the other, and then through the second partition 22a. The temperature of the air flow can again be adjusted at the location of this second partition 22a. The air flows onwards in the direction of the arrows 33 through a further two incubation trolleys 15 (not shown), and finally through the second end wall 5, in the direction of the arrows 34.

After it leaves the second end wall 5, the flow of air will again be moved in the direction of the arrows 31, 32 etc. with the aid of the ventilation means 27.

It can be seen in FIG. 2 that the trays 16 of the successive incubation trolleys 15 are arranged alternately at oppositely directed angles of 45° with respect to the vertical. By providing the trays of the successive trolleys, in contrast to those of the prior art, with an alternating angle, it is ensured that the flow of air through the climate chamber is as even as possible.

In order to ensure the temperature differences in the liquid which is used to heat or cool the walls 22 (22a), the liquid which is fed downwards has to be circulated with the aid of a circulation pump. In this way, it can be ensured that any temperature differences are evened out.

To ensure that the air is guided through the climate chamber 21 as efficiently as possible, the air permeability of the first end wall 4 will be kept at a lower level than that of the partitions 22, 22a. The air permeability of the first end wall 4 may, for example, be set at 10%. In this case, the air permeability of the partitions 22, 22a may be set at 30%. This means that a certain pressure can build up in the space which, as seen in the direction of flow, is located in front of the said first end wall 4, and the air is then forced through the end wall 4. The air permeability of the end wall 5 is also set at a lower level than that of the partitions 22, 22a. The permeability of the second end wall 5 may, for example, be set at 10%. Without the variation in air permeability of the walls 4, 22, 22a and 5, there is a risk of the air from the direction of flow 31 moving through the first end wall 4 at the bottom side and then leaving the climate chamber 21 at the top of the end wall 5. In that case, uniform flow is impossible. It will be clear that other values are possible for the air permeability of the successive walls 4, 22, 22a and 5, in order to achieve the effect described above.

The effect described above means that, depending on the heating or cooling of the air by the eggs in the incubation trolleys 15, the air can be restored to the desired temperature. The distance between the successive partitions can then be adjusted, taking into account the temperature difference between the air flow in the climate chamber 21 and the products.

The above text describes the situation in which the preheating or precooling means are accommodated in the first end wall 4. The advantage of this is that the walls 4, 22 and 22a may in principle be of identical design. Since it is advantageous for the permeability of the walls 4 and 22 to differ, the only difference between the walls is the extent of air permeability.

It should be understood that the preheating or precooling means may also be accommodated in the second end wall 5, since there is no heat exchange between the air flow and products in the path from the second end wall 5 back to the first end wall. However, since fresh ambient air can be added to the air flow in the vicinity of the fan 27, which may influence the temperature of the air flow), it is preferable to arrange the preheating or precooling means in the first end wall 4.

As an alternative, of course, a separately arranged heat exchanger may be used in the flow path between the end wall 5 and the end wall 4, serving as preheating or precooling means.

The device 20 furthermore has means 40 for measuring the $CO_2$ content of the air. Depending on the level of the $CO_2$ content, fresh ambient air can be added to the air flow with the aid of the ventilation opening 41. Air can be removed from the climate device 20 with the aid of the opening 42.

The hatching trolleys 15 which are located in the climate 21 are provided with trays 16, as has been stated above. In order to ensure a good exchange of temperature between the eggs on the trays 16 and the flow of air, these trays 16 may be tilted with respect to the horizontal. In the prior art, it is customary to tilt the tray 16, after approximately 1 hour, from a first inclined position into a second inclined position. Both inclined positions are shown in FIG. 3. In the prior art, it is customary for all the trays 16 of all the trolleys 15 to be placed in the same position at the same time. According to the present invention, it is possible for the position of the trays 16 in the incubation trolleys 15 to be alternated. This ensures that the air will flow even more evenly through the climate chamber 21.

Furthermore, as stated above, the climatic device 20 is closed off at the front and rear sides by means of a side wall (not shown). It must be possible for this side wall to be at least partially removed, in order to allow the incubation trolleys 15 to be moved in and out. It is possible to design the front side wall as a sliding door or roller shutter 50 (cf. FIG. 3). This has the advantage that when the sliding door 50 is opened, there is no obstacle to moving the incubation trolleys 15 into and out of the climate chamber 21.

The function and design of the partitions 22, 22a will be explained further with reference to FIG. 3.

FIG. 3 shows a side view of the side wall 22. As stated above, the side wall is designed to be at least partially air-permeable. The side wall may, for example, comprise a perforated plate 51, pipes 52 being attached inside or on the plate in order for heating or cooling medium, such as for example water, to be passed through them. It can be seen from FIG. 3 that the pipes 52 are of U-shaped design, one limb of the U being connected to a feed pipe 53 for the heating or cooling medium, and the second limb of the U being connected to a discharge pipe 54. The design of the side walls 22, 22a ensures that there is very good contact between the air which is fed through and the heating and/or cooling pipes. A possible way of attaching the pipes 52 to the plate 51 is shown in FIG. 4. FIG. 4 shows that the wall 51 tightly adjoins the outer wall of the pipe 52. This allows good heat transfer from the pipe 52 to the body of the plate 51. The pipes 52 are, for example, made from copper, while the plate 51 may be an aluminium plate.

When FIGS. 1 and 2 are compared, it can be seen that the top trays of the incubation trolleys 15 in the device shown in FIG. 2 are closer to the ceiling than the top trays in the device shown in FIG. 1. This is possible because raised sections are arranged in the ceiling of the device shown in FIG. 2, in which raised sections the pivoting mechanism for the trays can be accommnodated.

Figure 5:
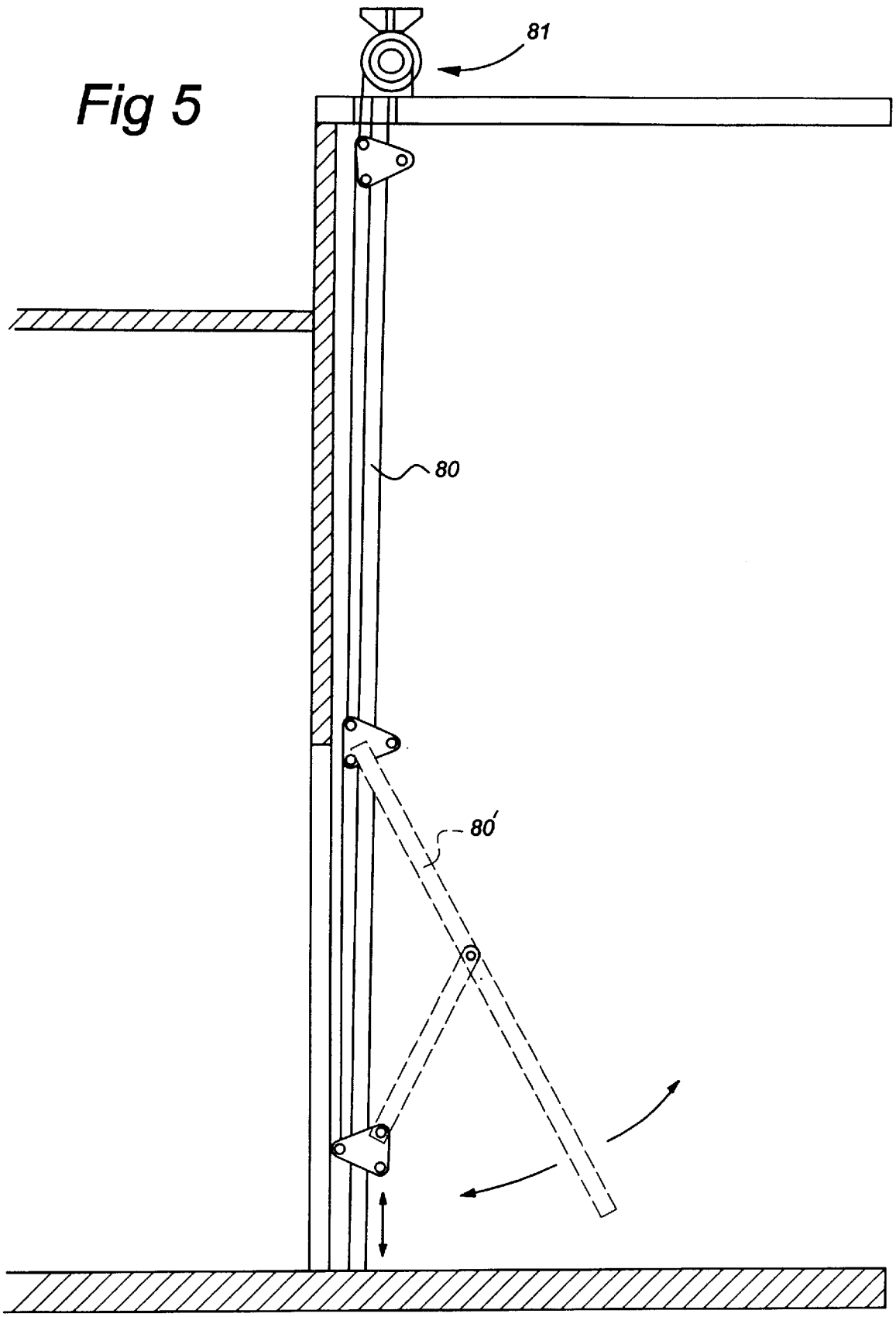
FIG. 5 shows a cross section through a possible embodiment of the door from the climatic device according to the invention.

FIG. 5 shows a possible embodiment of a door for the climatic device according to the present invention. As has already been noted with reference to FIG. 3, the door may be designed as a roller shutter. FIG. 5 shows the situation in which the door is formed by a flat panel 80 which can. be moved up or down with the aid of a drive mechanism 81. In the down position (indicated by reference numeral 80'), the panel which serves as door 80 can be tilted in order to allow the door 80 to be cleaned.

The above description speaks of a climatic device which is provided with a climate chamber. The climatic device described above is eminently suitable for positioning in incubation trolleys for eggs in the climate chamber. It should be understood that the above climatic device can advantageously be used for numerous other chambers in which it is necessary for it to be possible to accurately control the air temperature, the humidity and the air flow.

For example, the method and the device according to the present invention are also eminently suitable for use in hatching devices. These are the devices in which eggs are generally positioned for approximately three days before the egg actually hatches.

What is claimed is:

1. Method for controlling the temperature in a climate chamber in which a flow of air is guided through the climate chamber, in order to heat or cool product located in the climate chamber, wherein the temperature of the airflow is controlled with the aid of a heat exchanger, and the air flow is brought to a desired temperature with the aid of a first heat exchanger prior to or during the introduction of the air flow into the climate chamber, characterized in that the method comprises:

a. introducing the air flow into the climate chamber, b. guiding the air flow over product situated in the climate chamber, c. forcing the air flow in the climate chamber past a second heat exchanger, during which process any heating or cooling of the air flow is negated, d. guiding the air flow over product situated in the climate chamber downstream of the second heat exchanger.

2. Method according to claim 1, wherein the method further comprises:

e. forcing the air flow In the climate chamber past a third heat exchanger, during which process any heating or cooling of the air flow is negated, f. guiding the air flow over product situated in the climate chamber downstream of the third heat exchanger.

3. Climatic device comprising:

a climate chamber, having a bottom wall, a top wall, a front and rear side wall and a first and a second end wall, means for heating or cooling the air in the climate chamber, the said means being accommodated in the said chamber, and ventilation means for generating an air flow through the climate chamber, in which device the end walls are air-permeable, the ventilation means being used to generate an air flow from the first end wall, through the climate chamber, towards the second end wall, and the device comprising preheating or precooking means for bringing the air flow to the correct temperature prior to or during the passage of the air flow through the first end wall, wherein at least one air-permeable partition is incorporated between the end walls, in which partition the heating or cooling means are accommnodated.

4. Climatic device according to claim 3, characterized in that the preheating or precooling means are accommodated in the first end wall.

5. Climatic device according to claim 2, wherein the device is provided with control means for setting the temperature of the heating or cooling means and of the preheating or precooling means.

6. Climatic device according to claim 2, wherein the ventilation means are in communication, by means of a flow passage, with the first end wall, the extent of air permeability of the first end wall being lower than that of the first partition in the direction of flow.

7. Climatic device according to claim 2, wherein the air permeability of the second end wall is lower than that of the last partition in the direction of flow.

8. Climatic device according to claim 2, wherein the air permeability of the first end wall is from 5 to 25%, while the air permeability of the first partition in the direction of flow is from 20 to 50%.

9. Climatic device according to claim 2, wherein the air permeability of the second end wall is from 5 to 25%, while the air permeability of the last partition in the direction of flow is from 20 to 50%.

10. Climatic device according to claim 2, wherein, as measured in the direction of flow, the distance between the successive end walls, and partitions is matched to the width of two standard incubation trolleys.

11. Climatic device according to claim 2, wherein the height of the end walls, the side walls and the partitions are matched to the height of a standard incubation trolley.

12. Climatic device according to claim 2, wherein the at least one side wall is designed as a sliding wall.

13. Climatic device according to claim 2 wherein the air permeability of the first end wall is from 5 to 15%, while the air permeability of the first partition in the direction of flow is from 25 to 40%.

14. Climatic device according to claim 2 wherein the air permeability of the first end wall is 10%, while the air permeability of the first partition in the direction of flow is 30%.

15. Climatic device according to claim 2 wherein the air permeability of the second end wall is from 5 to 15%, while the air permeability of the last partition in the direction of flow is from 25 to 40%.

16. Climatic device according to claim 2 wherein the air permeability of the second end wall is 10%, while the air permeability of the last partition in the direction of flow is 30%.

* * * * *